United States Patent
Verykios et al.

(10) Patent No.: US 10,961,122 B2
(45) Date of Patent: Mar. 30, 2021

(54) HEAT INTEGRATED REFORMER WITH CATALYTIC COMBUSTION FOR HYDROGEN PRODUCTION

(75) Inventors: Xenophon Verykios, Patra (GR); Thomas Halkides, Patra (GR); Andreas Stavrakas, Patra (GR); Aris Basagiannis, Patra (GR)

(73) Assignee: Helbio S.A., Rio (GR)

( * ) Notice: Subject to any disclaimer, the term of this patent is extended or adjusted under 35 U.S.C. 154(b) by 127 days.

(21) Appl. No.: 14/376,540

(22) PCT Filed: Feb. 6, 2012

(86) PCT No.: PCT/GR2012/000004
§ 371 (c)(1),
(2), (4) Date: Aug. 4, 2014

(87) PCT Pub. No.: WO2013/117948
PCT Pub. Date: Aug. 15, 2013

(65) Prior Publication Data
US 2014/0369897 A1    Dec. 18, 2014

(51) Int. Cl.
*C01B 3/38* (2006.01)
*B01J 8/02* (2006.01)
(Continued)

(52) U.S. Cl.
CPC ............. *C01B 3/386* (2013.01); *B01J 8/025* (2013.01); *B01J 8/0214* (2013.01); *B01J 8/0285* (2013.01);
(Continued)

(58) Field of Classification Search
CPC combination set(s) only.
See application file for complete search history.

(56) References Cited

U.S. PATENT DOCUMENTS

| 4,401,554 A | * | 8/1983 | Choi | ............... C10G 59/02 208/64 |
| 4,714,593 A |   | 12/1987 | Naito et al. | |

(Continued)

FOREIGN PATENT DOCUMENTS

| DE | 2610556 B1 | 6/1977 |
| EP | 0124226 A2 | 11/1984 |

(Continued)

OTHER PUBLICATIONS

Lattner J R et al: "Comparison of methanol-based fuel processors for PEM fuel cell systems", Applied Catalysis B: Environmental, Elsevier, Amsterdam, NL, vol. 56, No. 1-2, Mar. 10, 2005, pp. 149-169, XP025331817, ISSN: 0926-3373.

(Continued)

*Primary Examiner* — Imran Akram
(74) *Attorney, Agent, or Firm* — Carter, DeLuca & Farrell LLP; George Likourezos

(57) ABSTRACT

A heat integrated steam reformer, which incorporates a catalytic combustor, which can be used in a fuel processor for hydrogen production from a fuel source, is described. The reformer assembly comprises a reforming section and a combustion section, separated by a wall. Catalyst (21) able to induce the reforming reactions is placed in the reforming section, either in the form of pellets or in the form of coating on a suitable structured catalyst substrate such as fecralloy sheets. Catalyst (22) able to induce the combustion reactions is placed in the combustion section in the form of coating on suitable structured catalyst substrate such as fecralloy sheet. A steam and fuel mixture (30) is supplied to the reforming section (14) where it is reformed to produce hydrogen. A fuel and an oxygen (32) containing gas mixture is supplied to the combustion section where it is catalytically combusted to supply the heat for the reformer. The close placement of the combustion and reforming catalysts facilitate efficient (Continued)

heat transfer. Multiple such assemblies can be bundled to form reactors of any size. The reactor made of this closely packed combustion and reforming sections is very compact.

16 Claims, 4 Drawing Sheets

(51) Int. Cl.
  *C01B 3/32* (2006.01)
  *B01J 19/24* (2006.01)

(52) U.S. Cl.
  CPC ......... *B01J 8/0292* (2013.01); *B01J 19/2485* (2013.01); *C01B 3/323* (2013.01); *C01B 3/384* (2013.01); *B01J 2208/0084* (2013.01); *B01J 2208/00132* (2013.01); *B01J 2208/00309* (2013.01); *B01J 2208/00495* (2013.01); *B01J 2208/00557* (2013.01); *B01J 2219/00265* (2013.01); *C01B 2203/0811* (2013.01); *C01B 2203/1017* (2013.01); *C01B 2203/1058* (2013.01); *Y02P 20/52* (2015.11)

(56) References Cited

U.S. PATENT DOCUMENTS

| | | | |
|---|---|---|---|
| 4,909,808 A | 3/1990 | Voecks | |
| 6,387,554 B1 | 5/2002 | Verykios | |
| 6,616,909 B1 | 9/2003 | Tonkovich et al. | |
| 7,410,565 B1* | 8/2008 | Lapinski | C10G 35/085 208/63 |
| 2002/0071797 A1* | 6/2002 | Loffler | C01B 3/40 422/600 |
| 2002/0146359 A1 | 10/2002 | Lomax et al. | |
| 2003/0105172 A1 | 6/2003 | Bowe et al. | |
| 2004/0105795 A1 | 3/2004 | Gough | |
| 2004/0258587 A1 | 12/2004 | Bowe et al. | |
| 2005/0123472 A1 | 6/2005 | Hall et al. | |
| 2006/0154123 A1* | 7/2006 | Kim | B01J 8/025 429/423 |
| 2007/0071663 A1* | 3/2007 | Lee | H01M 8/0618 422/202 |
| 2007/0258872 A1* | 11/2007 | West | B01J 19/249 422/222 |
| 2007/0258883 A1 | 11/2007 | West et al. | |
| 2008/0166276 A1* | 7/2008 | Bowe | B01J 19/249 422/600 |
| 2009/0064579 A1 | 3/2009 | Wakasugi et al. | |
| 2009/0258259 A1* | 10/2009 | Leshchiner | C01B 3/16 429/423 |
| 2010/0043289 A1* | 2/2010 | England | B01J 19/2485 48/116 |
| 2010/0178219 A1* | 7/2010 | Verykios | B01J 4/005 422/621 |
| 2010/0324158 A1* | 12/2010 | Bowe | B01J 19/249 518/712 |

FOREIGN PATENT DOCUMENTS

| | | |
|---|---|---|
| EP | 0922666 A1 | 6/1999 |
| EP | 1024111 A1 | 8/2000 |
| EP | 1361919 A1 | 11/2003 |
| EP | 1679111 A2 | 7/2006 |
| EP | 1679758 A1 | 7/2006 |
| EP | 1767265 A2 | 3/2007 |
| EP | 2158962 A1 | 3/2010 |
| JP | S58176103 A | 10/1983 |
| JP | 3072562 B2 | 7/2000 |
| WO | 9902263 A1 | 1/1999 |
| WO | 2008146052 A1 | 12/2008 |

OTHER PUBLICATIONS

Delsman et al: "Comparison Between Conventional Fixed-Bed and Microreactor Technology for a Portable Hydrogen Production Case", Chemical Engineering Research and Design, Part A, Institution of Chemical Engineers, vol. 83, No. 9, Sep. 1, 2005, pp. 1063-1075.
International Search Report issued by the European Patent Office in connection with International Application No. PCT/GR2012/000004, dated May 22, 2012.
International Search Report issued by the European Patent Office in relation to International Application No. PCT/GR2012/000011 dated Nov. 29, 2012.
Canadian Office Action dated Apr. 30, 2019 corresponding to counterpart Canadian Patent Application No. 2,862,538.
Canadian Office Action dated Jun. 27, 2019 corresponding to counterpart Patent Application CA 2,862,527.
Written Opinion of the International Searching Authority issued by the European Patent Office in relation to International Application No. PCT/GR2012/000004 dated May 22, 2012.
European Office Action received from the European Patent Office in relation to EP Application No. 12709166 dated Apr. 30, 2020.

* cited by examiner

HEAT INTEGRATED REFORMER WITH CATALYTIC COMBUSTION FOR HYDROGEN PRODUCTION

FIELD OF THE INVENTION

This invention relates to reforming reactor assemblies for hydrogen production and more particular to reactors where hydrocarbons or oxygenates are reformed to produce a hydrogen rich stream.

BACKGROUND OF THE INVENTION

Hydrogen is used in many chemical processes as for example in ammonia synthesis and in oil refining, in very large quantities. There are other processes which require hydrogen in smaller quantities, as for example oil hydrogenation plants, glassblowing operations, cooling applications in electricity production, photovoltaic materials processing, etc. Furthermore, the use of hydrogen as an alternative energy vector has gained wide acceptance and is progressing along the road to implementation. Hydrogen can be used in both internal combustion engines and fuel cells. Particularly, its usage in fuel cells to produce electricity or to co-generate heat and electricity represents the most environmentally friendly energy production process due to the absence of any pollutant emissions. Most importantly, hydrogen can be produced from renewable energy sources such as biofuels, alleviating concerns over the long-term availability of fossil fuels and energy supply security.

Large scale production of hydrogen is well understood and widely practiced in refineries and chemical plants—particularly in the ammonia production industry. For industrial applications requiring smaller quantities, hydrogen is usually transported either cryogenically or in highly compressed form. The reason is that the technology for large scale hydrogen production can not be easily downscaled. Furthermore, for hydrogen to be successfully introduced into the transportation and distributed energy production sectors, refueling and distribution networks must be established.

The problem lies in the low energy density of hydrogen which makes its transportation very inefficient and expensive. Transporting hydrogen in compressed or liquid form requires specialized and bulky equipment that minimizes the amount that can be safely carried, increasing resource consumption and cost. It is, then, apparent that the hydrogen infrastructure required must be based on distributed production facilities. This applies to both, hydrogen as industrial chemical of medium or low consumption and as an energy vector.

Distributed hydrogen production facilities are the focus of numerous research and development activities. While the scale of such facilities is much smaller than the ones employed in the refineries and the large chemical plants, the basic steps remain the same. The most commonly employed method involves hydrogen production by the reformation of hydrocarbon fuels. These fuels must already have an established distribution network as to address the raw material availability concerns. They include natural gas, propane, butane (LPG) and ethanol as the representative of the biofuels. Natural gas is mostly methane and can be reformed according to the reaction:

$$CH_4 + H_2O \rightarrow CO + 3H_2 \quad \Delta H = 49.3 \text{ kcal/mol}$$

Propane, butane and ethanol can be reformed according to the reactions:

$$C_3H_8 + 3H_2O \rightarrow 3CO + 7H_2 \quad \Delta H = 119.0 \text{ kcal/mol}$$

$$C_4H_{10} + 4H_2O \rightarrow 4CO + 9H_2 \quad \Delta H = 155.3 \text{ kcal/mol}$$

$$C_2H_5OH + H_2O \rightarrow 2CO + 4H_2 \quad \Delta H = 57.2 \text{ kcal/mol}$$

As can be seen from the heats of reaction ($\Delta H$), all of the reforming reactions are highly endothermic, requiring substantial amounts of heat input which must be covered by an external heat supply. The heat deficit becomes even larger since the reactions take place at temperatures in the range of 700-900° C. which means that the reactants must be heated-up to such temperatures.

The reforming reactions typically take place in steam methane reformers. The reforming reaction takes place inside reforming tubes filled with a reforming catalyst. The reforming tubes are typically at high pressure of 20-30 bar. The required heat is typically supplied by placing the catalyst containing tubes of the reactor in rows inside a fired furnace. Between the rows are placed combustion burners that combust fuel and air in an open flame to provide the required heat. The high temperature of the flame necessitates that the combustion burners must be placed at a sufficient distance from the reforming tubes to prevent the tubes from high temperature exposure which could destroy the tubes. This is a rather inefficient arrangement since the hydrogen producing reforming reaction forms a small part of overall reactor. Materials limitations also dictate the avoidance of extremely high temperatures (>1000° C.) for the reforming reactor tubes, further limiting the ability to place the combustion burners in close proximity to the reforming tubes. All these mean that traditional steam methane reforming reactor configurations are very large and new configurations must be developed to decrease the size and the cost of such systems.

Different configurations have been proposed previously. For reactions requiring high heat fluxes, like the reforming reactions, U.S. Pat. No. 6,616,909 describe a reactor system consisting of porous foam catalysts in conjunction with microchannel reactors to obtain high rates of heat transfer. Such a configuration presents significant difficulties, such as excessive pressure drop, which will limit its effectiveness for large scale systems.

U.S. Pat. No. 6,387,554 describes a reactor consisting of a bundle of small diameter ceramic or metallic tubes enclosed in a thermally insulated vessel. Catalysts are deposited on the internal and external surfaces of the tubes and heat is transferred across the tube walls. Part of the tubes may not be covered by catalyst and may act as heat exchange zones. Although this system resulted in a compact configuration the replacement of the catalyst is problematic and as a result the whole reactor must be replaced when the catalyst effectiveness for either the combustion or the reforming reaction declines.

The reactor described in EP0124226 comprises a double-tube reactor having a steam reforming catalyst coated on the outside of the inner tube. Alternatively, a set of inner tubes may be mounted in a first tube plate and a set of outer tubes in a second tube plate, the tube plates being disposed across a cylindrical shell so as to define a heat exchange zone. The heat source is a burner. Since the heat source is a burner the limitation of burner placement in relation to the reforming catalyst placement prevent the construction of a compact low cost system.

Another reactor described in EP1361919 comprises a tube plate which carries a number of elongated pockets extending transversely into a shell. A second tube plate extends across the shell and supports a number of tubular elongated conduits corresponding to the number of pockets. The conduits are open-ended and extend into and almost to the end of the pockets. Catalyst may be coated on the surfaces of the pockets and/or the conduits. However, in such a configuration catalyst replacement is problematic.

U.S. Patent Application US2010/0178219A1 by Verykios et al. describes a reformer whose tubes are coated with a combustion catalyst on the outer surface and a reforming catalyst on the inner surface. Such a configuration results in high rates of heat transport from the combustion side to the reforming side. However, in such a configuration catalyst replacement is a problem

BRIEF DESCRIPTION OF THE INVENTION

The present invention relates to a reformer which produces a hydrogen rich stream by the process known as steam reforming of hydrogen containing compounds, such as hydrocarbons, oxygenates, etc. The reformer is comprised of two sections: one where the steam reforming reactions take place and one where combustion of a fuel provides the heat necessary to carry out the reforming reactions. The two sections are separated by a thin metal partition and are in close thermal contact as to facilitate the efficient transfer of heat from the combustion to the reforming section. Combustion takes place over a suitable structured catalyst that can be removed and replaced when its effectiveness declines. A suitable catalyst is made of a corrugated metal foil or other structured or ceramic materials including corrugated metal monoliths. Corrugated metal material can be any metal or alloy that can withstand high temperatures as for example alloys of the formulation FeCrAlY that are typically referred as fecralloys and have been widely used as combustion catalyst supports. The combustion catalyst can be formed by at least one of these corrugated metal foils. Since the catalyst is not coated on the combustion tube but on a foil it can be easily removed and replaced. The corrugated foil consists of multiple passages through which the combustion mixture can flow but it must also be in close contact with the combustion tube wall to facilitate efficient heat transfer. Steam reforming is a catalytic reaction and takes place over another suitable catalyst.

In one aspect of the invention, a heat integrated combustor/steam reformer assembly is provided for use in a fuel processor. A fuel and steam mixture is supplied to the reformer to be reformed and a fuel and air mixture is supplied to the combustor to be combusted.

As a feature, the integrated combustor/steam reformer assembly includes a tubular section defined by a cylindrical wall and a housing defining an axially extending concentric annular passage in heat transfer relation to each other. A fuel and air mixture is supplied to the tubular section. The inside wall of the tubular section is in contact with a fecralloy sheet coated with a catalyst that induces the combustion reaction in the feed. A fuel and steam mixture is supplied to the annular passage. The annular passage is either filled with a suitable catalyst in pellet form which promotes the reformation reaction, or it contains, in close contact with the tube, fecralloy sheets coated with the reforming catalyst.

As another feature, the integrated combustor/steam reformer assembly includes a tubular section defined by a cylindrical wall and a housing defining an axially extending concentric annular passage in heat transfer relation to each other, as described above. In this case, fuel and steam mixture is supplied to the tubular section which contains reforming catalyst in pellet form or fecralloy sheets coated with catalyst which induces reforming reactions. A fuel and air mixture is supplied to the annular passage which contains fecralloy sheets coated with suitable catalyst which promotes combustion reactions.

According to another feature of the invention, the integrated combustor/steam reformer assembly includes a tubular section defined by a cylindrical wall and a housing defining an axially extending concentric annular passage in heat transfer relation to each other. A fuel and air mixture is supplied to the tubular section. The middle part of the inside wall of the tubular section is in contact with fecralloy sheet coated with catalyst which promotes the combustion reaction. A fuel and steam mixture is supplied to the annular passage. The middle part of the tubular section contains reforming catalyst in pellet form or coated on fecralloy sheets. The first part of the tubular section which does not contain catalyst acts as a heat transfer devise allowing heat to be transferred from the hot products of the reforming reaction to the fuel and air mixture entering the combustor, thus preheating the feed to the combustor while cooling the reforming products. The final part of the tubular section not containing catalyst acts as a heat transfer devise allowing heat to be transferred from the hot products of the combustion reaction to the fuel and steam mixture entering the reformer, thus preheating the feed to the reformer while cooling the combustion products.

In another aspect of the invention the integrated combustor/steam reformer assembly includes a multitude of tubular sections defined by cylindrical walls separated from each other and supported on each end on plates machined as to allow the cylindrical walls to pass through them and to be in fluid connection with only one side of the plate. The sub-assembly of the tubular sections and the plates is enclosed with a cylindrical housing which isolates the space defined by the inner part of the housing and the plates from being in fluid connection with the surroundings. The inside wall of the tubular sections is in contact with fecralloy sheets, preferably corrugated, coated with a catalyst that induces the desired reaction in the combustor feed. The outside space of the tubular sections contains a catalyst in pellet form that induces the desired reaction in the reformer feed or it contains fecralloy sheets, preferably corrugated, coated with a suitable catalyst that promotes reformation reactions. The assembly also includes an appropriately shaped reactor head that facilitates the introduction and distribution of the fuel and air mixture inside the tubular sections and an appropriately shaped reactor head that facilitates the collection and exit of the combustion products. A flow passage on one side of the cylindrical housing introduces the fuel and steam mixture in the enclosed reforming section. A second flow passage on the opposite side of the cylindrical housing facilitates the withdrawal of the reforming products.

In yet another aspect of the invention, in the integrated combustor/steam reformer assembly described above, the tubular section contains reforming catalyst in pellet form or fecralloy sheets coated with a reforming catalyst, while the outer wall of the tubular sections is in contact with fecralloy sheets, preferably corrugated, coated with combustion catalyst. In this case, the fuel and steam mixture is directed into the tubular section while the fuel and air mixture is directed to the outside section.

According to another feature of the invention, metal plates are included inside the cylindrical housing and perpendicular to the tubular sections to guide the flow of the reforming feed, intermediates and products to flow perpendicular to the tubular sections and over several passages.

These and other features and advantages of the present invention will become apparent from the following description of the invention and the associated drawings.

DETAILED DESCRIPTION OF THE PREFERRED EMBODIMENTS

The present invention is described in detail with reference to a few preferred embodiments illustrated in the accompanying drawings. The description presents numerous specific details included to provide a thorough understanding of the present invention. It will be apparent, however, to one skilled in the art that the present invention can be practiced without some or all of these specific details. On the other hand, well known process steps, procedures and structures are not described in detail as to not unnecessarily obscure the present invention.

Figure 1A:
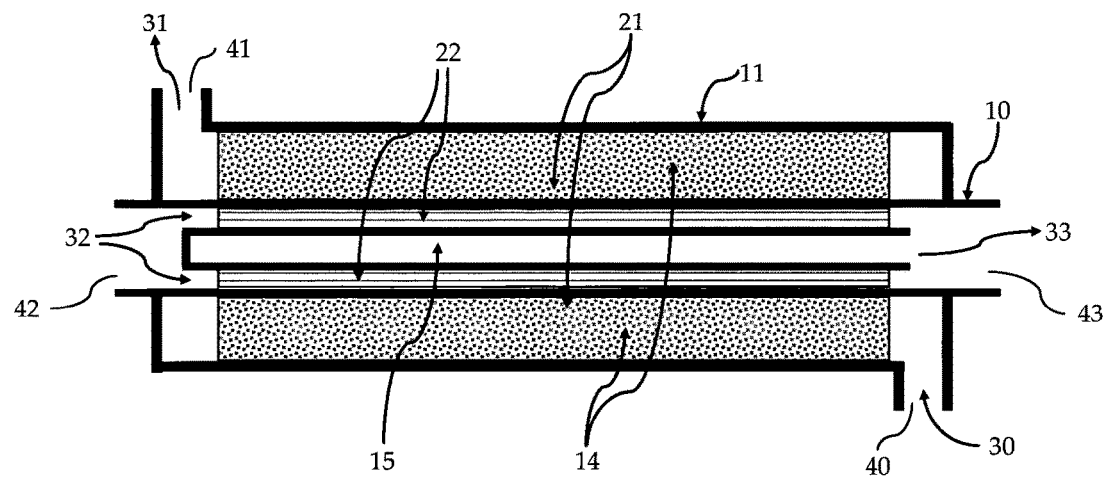
FIG. 1a is a perspective view of one embodiment of the heat integrated reformer with catalytic combustion of the invention.

FIG. 1A illustrates the heat integrated reformer according to one embodiment of the present invention. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the tubular section through flow passage 42. The tubular section contains a structured combustion catalyst. An example of a structured catalyst is a fecralloy sheet, preferably corrugated, which is coated with a combustion catalyst 22 that induces the desired reaction in the combustor feed. The products of the combustion reactions 33 exit the tubular section through flow passage 43. A fuel and steam mixture 30 is supplied to the annular passage through flow passage 40. The outside area of the tubular section contains either catalyst pellets 21 capable of inducing the desired reaction in the reformer feed or fecralloy sheets, preferably corrugated, which are coated with the catalyst 21. The products of the reforming reactions 31 exit the annular passage through flow passage 41.

The fuel to the combustor can be any available and suitable fuel. Such fuels include methane, natural gas, propane, butane, liquefied petroleum gas, biogas, methanol, ethanol, higher alcohols, ethers, gasoline, diesel etc. For the embodiment illustrated in FIG. 1A, the fuels normally available in liquid form must be vaporized before entering the combustion zone. The same fuels can be fed to the reforming zone to undergo the hydrogen producing reforming reactions. Another potential fuel to the combustor is the hydrogen depleted off-gas from the anode of a fuel cell when the reformer is used as a part of a fuel processor producing hydrogen for a fuel cell. Yet another potential fuel to the combustor is the hydrogen depleted off-gas from the pressure swing adsorption (PSA) or any other hydrogen purification devise when the reformer is used as a part of a fuel processor producing a hydrogen rich stream that feeds such a device to produce high purity hydrogen.

The temperatures and pressures of the two streams entering the combustor and the reformer, respectively, need not be the same. Typically, combustion takes place at low or near-atmospheric pressure, although high pressure combustion is widely practiced. Reforming can take place at pressures somewhat above atmospheric to moderately high (up to 50 barg). The cylindrical wall of the tubular section should be of sufficient strength to allow for the pressure differential between the two streams. It is also apparent that different geometries can be used instead of cylindrical shapes should they offer advantages in particular applications. The composition of the mixture entering the combustor should be such as to ensure complete combustion of the fuel. Although a stoichiometric ratio of air to fuel is sufficient, higher ratios can be employed with the present invention. The composition of the mixture entering the reforming section of the assembly is determined by the stoichiometries of the reforming reactions for the given fuel. It is typical practice to provide a higher than stoichiometric steam-to-fuel ratio to minimize possible side reactions that can cause shoot or carbon formation to the detriment of the catalyst and/or the reactor. All suitable steam-to-carbon ratios in the range from 1 to 25 can be employed with the present invention.

The major advantage of the present invention is the heat integration between the combustion 15 and the reforming 14 zones. Combustion takes place on the catalytic film which is coated on the structured catalyst 22 placed on one side of the wall 10 separating the two zones. The heat that is generated on the combustion side is quickly transferred and used on the reforming side. This rapid heat transfer is critical in maintaining the combustion side catalyst at temperatures below 1200 C and, more preferably, below 1000 C. These temperatures ensure acceptable catalyst life and permit the use of a very compact combustion zone which allows the reactor assembly to be dramatically smaller compared with a flame-based reformer which needs to maintain a significant distance between the flame generation and the reforming sections. The lower temperatures also allow the use of less expensive alloys for the construction of the reactor. The lower temperatures also mean no nitrogen oxide emissions as their formation requires much higher temperatures.

The structured combustion catalyst can preferably be in the form of a corrugated metal foil made of a high temperature resistant metal or metal alloy. A metal alloy such as an alloy with the formula FrCrAlY, commonly referred to as fercalloy, can be used for high temperature combustion catalyst support. The corrugated foil is supported on a rod or tube placed inside tube 10. The corrugated foil is wrapped on the tube or rod so that the corrugated channels run parallel to the axis of the tube 10. Reforming takes place on the catalyst placed in reforming zone 14 enclosed between tube 10 and reactor wall 11. The catalyst 21 can be in the form of pellets or it can be a structured catalyst or monolith. The wall 10 can be constructed from any material, but materials that offer low resistance to heat transfer such as metals and metallic alloys are preferred. In this configuration, heat is generated by combustion in the catalytic chamber 22 and is transported very easily and efficiently though the wall 10 to the reforming chamber 21 where the heat demanding reforming reactions take place. Heat is generated where it is needed and does not have to overcome significant heat transfer resistances to reach the demand location resulting in high efficiencies. The presence of a catalyst and lower temperatures permit significantly higher space velocities to be used compared to flame based reformers. Space velocity is defined as the ratio of the feed flow at standard conditions to the empty volume of the reactor. For the catalyst section of the heat integrated reformer, space velocities of 1000 to 100000 $hr^{-1}$, more preferably 5000-50000 $hr^{-1}$ and even more preferably 10000 to 30000 $hr^{-1}$ can be used. In flame based reformers space velocities are typically below 2000 $hr^1$.

The catalyst on the reforming side can be a pellet catalyst or it can also be a structured catalyst on support. In the case of a pellet catalyst, space velocities similar to the ones used in flame based reformers can be used (1000-10000 $hr^{-1}$). In the case of structured catalyst much higher space velocities can be used preferably 10,000-100000 $hr^{-1}$ or more preferably 10,000-50000 $hr^{-1}$.

The suitable combustion and, where applicable, the reforming catalysts, can be prepared by coating a relatively thin (5-1000 µm thick) catalytic film on the fecralloy sheets. Suitable catalysts typically consist of a metal oxide film and one or multiple metal phases dispersed on the film. The film is typically a metal oxide that may contain oxides of one or multiple elements from the IA, IIA, IIIA, IIIB and IVB groups of the periodic table of elements. The most typical combustion catalysts support is high surface area aluminum oxide. The dispersed metal phase catalyst may contain one or multiple elements from the IB, IIB, VIB, VIIB and VIII groups of the periodic table of elements. A common dispersed metal phase catalyst is palladium or platinum and mixtures thereof. The dispersed metal phase is typically 0.1-10% of the metal oxide film and more preferably 0.3-3%.

One method to prepare the catalytic film that ensures good adhesion to the fercalloy is to heat the fecralloy sheet to elevated temperatures in air. During the heating, aluminum, which is a component of the fercalloy, is diffusing out of the bulk of the alloy and forms an aluminum oxide surface layer. Upon this surface layer it is easy to coat alumina or other metal oxide supports for the desired dispersed metal phase which may be a precious or non-precious metal. Typical supports for reforming and combustion catalysts consist of oxides of aluminum, silicon, lanthanum, cerium, zirconium, calcium, potassium and sodium. The metal phase of reforming catalysts may contain nickel, cobalt, copper, platinum, rhodium and ruthenium. Nickel based catalysts are the most commonly used for reforming reactions.

Coating of the catalysts support on the fecralloy sheets can be accomplished by many techniques. After heating up so as to form the aluminum oxide layer at the surface, techniques such as dip coating from a solution of dispersed metal oxide particles or from a slurry which contains the metal oxide particles can be employed. Alternatively, catalyst can be deposited on the fecralloy sheets by spraying the catalytic components onto their surface, or by plasma deposition, etc. The catalyst support is then dried by calcination at elevated temperatures. The dispersed metal phase can be added to the support forming solution or slurry of the metal oxide particles or it can be added in a separate step from a solution of the desirable metal salt after the calcination step.

Figure 1B:
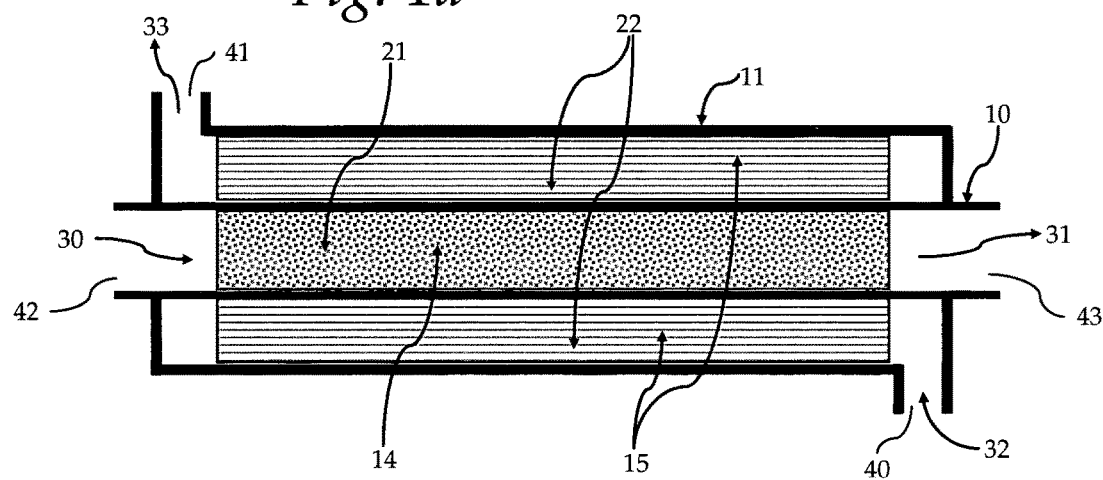
FIG. 1b is a perspective view of another embodiment of the heat integrated reformer with catalytic combustion of the invention.

FIG. 1B illustrates the heat integrated reformer according to another embodiment of the present invention. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the annular passage through flow passage 40. The outside wall of the tubular section contains fecralloy sheets coated with a catalyst film 22 that induces the desired reaction in the combustor feed. The products of the combustion reactions 33 exit the annular passage through flow passage 41. A fuel and steam mixture 30 is supplied to the tubular section through flow passage 42. The tubular section contains reforming catalyst pellets 21 or fecralloy sheets coated with a reforming catalyst film 21 that induces the desired reaction in the reformer feed. The products of the reforming reactions 31 exit the tubular section through flow passage 43.

Figure 1C:
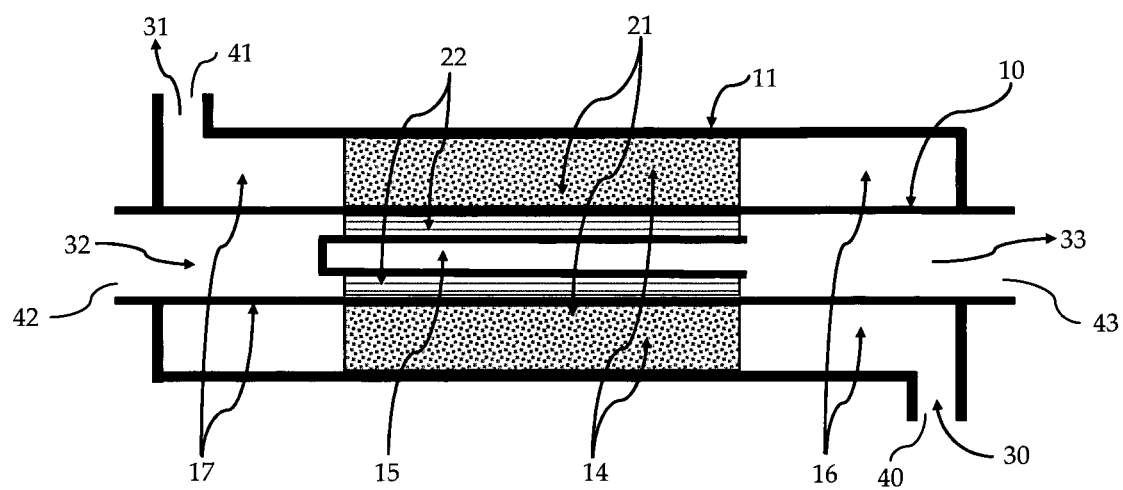
FIG. 1c is a perspective view of another embodiment of the heat integrated reformer with catalytic combustion of the invention.

FIG. 1C illustrates the heat integrated reformer according to yet another embodiment of the present invention. The integrated combustor/steam reformer assembly includes a tubular section defined by a cylindrical wall 10 that separates the combustion zone 15 from the reforming zone 14. The assembly housing 11 acts as the reactor wall and defines an axially extending concentric annular passage in heat transfer relation with the tubular section. A fuel and air mixture 32 is supplied to the tubular section through flow passage 42. In this embodiment, only the middle part of the inside wall of the tubular section contains the catalyst film 22 that induces the desired reaction in the combustor feed. Similarly, only the middle part of the outside of the tubular section contains catalyst 21 or fecralloy sheets coated with catalyst 21 that induces the desired reaction in the reformer feed. The parts of the reactor assembly which do not contain catalyst function as heat exchange regions of the reformer. Heat exchange zone 16 transfers heat from the hot combustion products to preheat the reforming section feed. Heat exchange zone 17 transfers heat from the hot reforming products to preheat the combustion section feed. In this manner, greater heat integration and utilization is accomplished inside the reformer. The products of the combustion reactions 33 exit the tubular section through flow passage 43. A fuel and steam mixture 30 is supplied to the annular passage through flow passage 40 counter-current to the combustion gases. The products of the reforming reactions 31 exit the annular passage through flow passage 41.

Figure 2A:
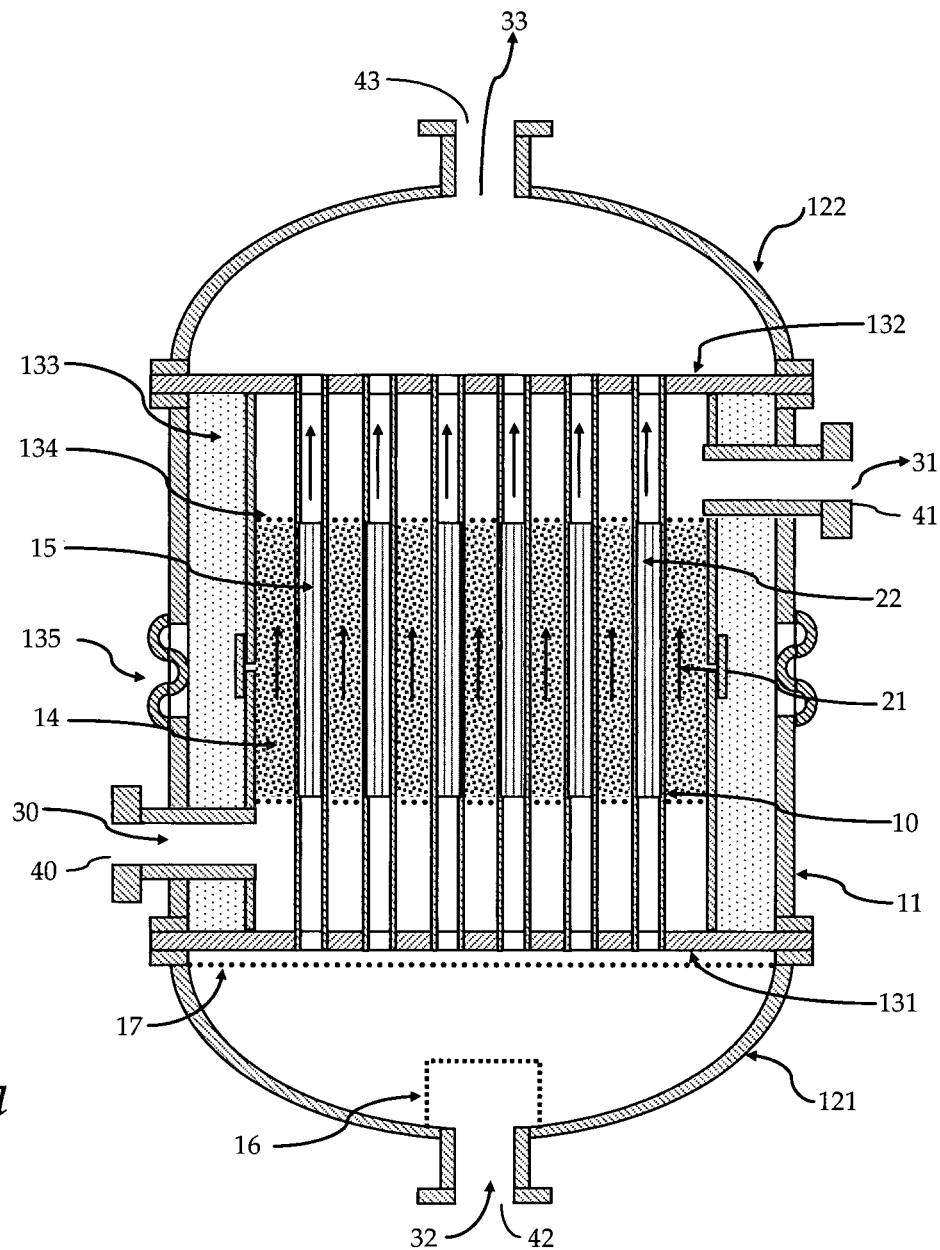
FIG. 2a is a perspective view of one embodiment of the heat integrated reforming reactor with catalytic combustion of the invention.

The production capacities of the reformers discussed in the previous examples are limited by their size, i.e. the diameter and length of the sections. Capacities of any size can be achieved by bundling together several such subassemblies. FIG. 2A illustrates one embodiment of such a heat integrated reforming reactor. The reactor consists of multiple tubes 10. The inside section of the tube contains the fecralloy sheets coated with a combustion catalyst film 22 that induces the desired combustion reactions. The outside section of the tube contains the reforming catalyst pellets 21 or the fecralloy sheets coated with a reforming catalyst film 21 that induces the desired reforming reactions. The tubes are supported on tube sheets 131 and 132 on each end. The tube sheets are machined as to allow flow contact between the combustor feed, the combustion zone and the combustion product collection spaces. The tubes are welded on the tube sheets as to prevent any mixing between the species participating in the reforming reactions and those participating in the combustion reactions. The tube bundles are enclosed by the reactor wall 11 which also attaches to tube sheets 131 and 132 and defines an enclosed space 14 between the tubes 10 and the tube sheets 131 and 132. This space is the reforming zone. The reactor further consists of reactor heads 121 and 122. Ceramic insulation 133 in the form of a hard cast ceramic or fiber blanket can be added to minimize heat loss of the reactor and maintain the reactor wall temperature below 500 C or more preferably below 200 C.

The fuel and air feed to the combustor 32 enters the reactor through reactor nozzle 42. The mixture is distributed in the reactor head 121 by flow distributor 16 as to allow for uniform feeding of all tubes 10. Combustion takes place inside the tubes 10 on the combustion catalytic film 22. The combustion products 33 exit at the other end of the tubes supported on tube sheet 132, are collected in the reactor head 122 and leave the reformer through reactor nozzle 43. Since the tubes 10 and tube sheet 131 become very hot during operation, a flame arresting devise 17, which can be a perforated metallic sheet or a porous ceramic plate, is placed before tube sheet 131 to prevent back flash and uncontrolled combustion in the reactor head 121. The fuel and steam reforming feed 30 enters the reactor through reactor nozzle 40. The mixture comes in flow contact with the reforming catalyst pellets or reforming catalyst film 21 supported on the fecralloy sheets in contact with the outside wall of the tubes 10. The reforming catalyst induces the reforming reactions and the products 31 exit the reactor through flow passage 41. The reforming catalyst pellets can be supported in the reactor by a suitable metal plate 134 that is drilled to create holes that are sufficient large that present little resistance to reforming gas flow and keep the pellet catalyst in the desired location in the reactor. This metal plate also serves to distribute the reforming gas feed evenly along the radial dimension of the reactor.

The reactor wall contains an expansion joint 135 to facilitate different thermal expansions between the reactor tubes and the reactor wall, due to the fact that they are at different temperatures.

The reformer reactor shown in FIG. 2A operates in the so-called co-current mode, i.e. combustion and reforming mixtures flow in the same direction. The same reactor configuration can be employed in operation in the so-called counter-current mode, i.e.

combustion and reforming mixtures flowing in opposite directions. This can be achieved easily by interchanging the reforming feed and reforming exit nozzles.

Figure 2B:
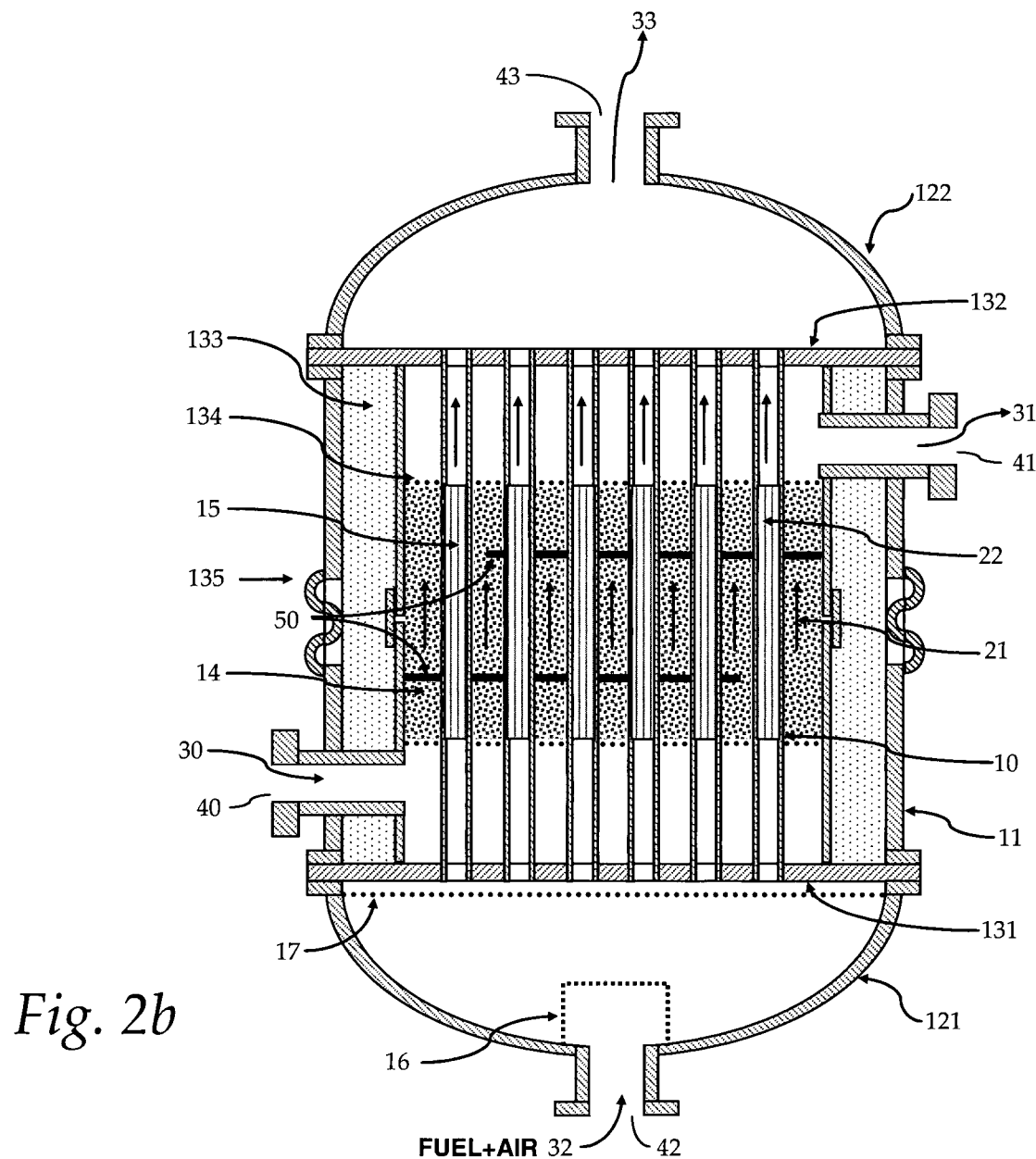
FIG. 2b is a perspective view of another embodiment of the heat integrated reforming reactor with catalytic combustion of the invention.

FIG. 2B illustrates another embodiment of a heat integrated reforming reactor with catalytic combustion. The fuel and steam reforming feed 30 again enters the reactor through flow passage 40. One or multiple baffles 50 are placed inside the reactor and perpendicular to the tubes 10 as to force the reacting mixture in a cross-flow multi-passage path through the reactor. This ensures higher fluid velocities, greater turbulence and better contact with the catalyst pellets which are outside tubes 10. This in turn results in lower mass transfer resistances in the fluid phase and higher reaction efficiencies while increasing the heat transfer rates as well. The products of the reforming reactions 31 again exit the reactor through flow passage 41.

Yet another embodiment of a heat integrated reforming reactor with catalytic combustion can be envisioned. Since the tubes 10 and tube sheet 131 become very hot during operation, combustion can be initiated on the front surface of tube sheet 131 and back propagate through reactor head 121 and, possibly, through flow passage 42 if the fuel and air are pre-mixed. To avoid such a potentially very dangerous situation, the air and fuel can be kept separated until they enter the tubes 10 where combustion is desired. Air entering the reactor head 121 is distributed and uniformly enters the tubes 10 through tube sheets. Fuel enters through the manifold and is distributed to each tube through appropriately sized and shaped tips. Allowing for a slightly higher pressure for the fuel stream than the air stream also allows for the Venturi effect to develop and prevent any fuel from flowing back. Alternatively, increasing the flow of the air stream, pushes the mixture further along the tubes 10 delaying combustion until the mixture is well inside the tubes.

Yet another embodiment can be envisioned having the reforming mixture flowing inside the tubes and the combustion mixture flowing in the annulus. Thus, in FIGS. 2A and 2B, the reforming catalyst, in pellet form or coated on fecralloy sheets, is placed inside tubes 10, while the combustion catalyst is placed in the space outside the tubes. The fuel and steam mixture is directed inside the tubes while the fuel and air mixture is directed in the space outside the tubes 10.

The heat integrated reforming reactor offers several advantages over conventional flame based reforming reactors. The catalytic combustion takes place at lower temperatures that permit close coupling of the combustion and reforming zones. In a flame based reformer the flame must be at a significant distance from the tube containing the reforming catalyst to prevent the tube from melting. As a result the integrated reforming reactor is several times smaller than a flame based reforming reactor and consequently has a much lower capital and installation cost. The flame based reformers can consist of hundreds of tubes and burners and a sophisticated feed flow distribution system is required to distribute the combustion feed and reforming feed to all burners and tubes evenly. The heat integrated reformer has a single inlet for the reforming and single inlet for the combustion feed gases which results in simple and inexpensive feed flow system. The flame reformers even with the use of low NOx burners still produce significant emissions of NOx in the combustion gases that have to be controlled with a separate selective catalytic reduction (SCR) catalyst and ammonia injection. The heat integrated reformer operates at low temperatures on the combustion side at which NOx formation is negligible.

The heat integrated reformer can be easily integrated with a hydrogen producing process that typically consists of a feed pretreatment system to remove impurities from natural gas, heat recovery equipment to recover heat to preheat the feed and raise steam, one or more water gas shift reactors to convert carbon monoxide to hydrogen and pressure swing adsorption system to separate hydrogen from syngas. The waste stream from the pressure swing adsorption system can be used as fuel to the heat integrated reformer combustion side. Another advantage of the hydrogen production process based on a heat integrated reformer is that the make up natural gas fuel that is normally supplied to ensure stable burner operation in flame based reformers can be reduced or eliminated. In that case most of the fuel requirement can be supplied by the PSA waste stream.

The hydrocarbon feed to the reformer is typically natural gas but other fuels can be used such as liquefied petroleum gas (LPG), propane, naphtha, diesel, ethanol or biofuels.

In addition to hydrogen, the heat integrated reformer can be used in the production of ammonia, production of methanol, Gas to Liquids, production of ethanol, production of oxo-alcohols and in general in processes where syngas (hydrogen and CO mixture) is required. For some processes it may be advantageous to co-feed carbon dioxide in the reforming zone to promote the conversion to carbon monoxide. In yet another application the heat integrated reformer can be used to produce hydrogen for fuel cells for the production of electricity.

While this invention has been described in terms of several preferred embodiments, there are alterations, permutations and equivalents that fall within the scope of the present invention and have been omitted for brevity. It is therefore intended that the scope of the present invention should be determined with reference to appended claims.

What is claimed is:

1. An apparatus for the production of hydrogen from a fuel source, comprising:
   a combustor configured to receive at least a combustor fuel and convert the combustor fuel into a combustor heat;
   a reformer disposed annularly about the combustor, wherein the reformer and the combustor define a gap therebetween and the reformer is configured to receive the combustor heat; and
   a removable structured catalyst support disposed within the gap and coated with a catalyst to induce combustor fuel combustion reactions that convert the combustor fuel to the combustor heat, the structured catalyst support being in contact with the combustor and the reformer, forming heat exchange zones where heat is transferred between a feed of the combustor and products of the reformer, and between a feed of the reformer and products of the combustor,
   wherein the reformer being configured to receive at least a reformer fuel and to produce a reformate containing primarily hydrogen,
   wherein the reformer further containing a reforming catalyst to induce reformer fuel reforming reactions to produce the reformate,
   wherein the structured catalyst support of the combustor is made of corrugated fecralloy sheets,
   wherein the corrugated fecralloy sheets are coated with a high surface area alumina film containing a dispersed metal phase of palladium or platinum metal, and mixtures thereof, and
   wherein the dispersed metal phase is between 0.1-10% of the alumina film.

2. An apparatus according to claim 1, wherein the reforming catalyst includes a nickel based catalyst.

3. The apparatus of claim 1, wherein the reformer fuel to be reformed and the combustor fuel to be combusted are in countercurrent flow configuration to each other.

4. An apparatus according to claim 1, wherein the reforming catalyst includes catalyst pellets.

5. An apparatus according to claim 1, wherein the reforming catalyst includes a structured catalyst support coated with a catalyst.

6. An apparatus according to claim 5, wherein the structured catalyst support is coated with a catalyst is removable.

7. An apparatus according to claim 1, wherein the reforming catalyst is fecralloy sheets coated with a catalyst.

8. An apparatus according to claim 7, wherein the fecralloy sheets being in close contact with the combustor and the reformer.

9. An apparatus for the production of hydrogen from a fuel source, comprising:
   a combustor configured to receive at least a combustor fuel and convert the combustor fuel into a combustor heat;
   a reformer disposed annularly about the combustor, wherein the reformer and the combustor define a gape therebetween and the reformer is configured to receive the combustor heat; and
   a removable structured catalyst support disposed within the gap and coated with a catalyst to induce combustor fuel combustion reactions that convert the combustor fuel to the combustor heat, the structured catalyst support being in contact with the combustor and the reformer,
   wherein the structured catalyst support of the combustor is made of corrugated fecralloy sheets,
   wherein the corrugated fecralloy sheets are coated with a high surface area alumina film containing a dispersed metal phase of palladium or platinum metal, and mixtures thereof, and
   wherein the dispersed metal phase is between 0.1-10% of the alumina film.

10. An apparatus according to claim 9, wherein the reformer further containing a reforming catalyst to induce reformer fuel reforming reactions to produce the reformate, and wherein the reforming catalyst is a nickel based catalyst.

11. The apparatus of claim 10, wherein the reformer fuel to be reformed and the combustor fuel to be combusted are in countercurrent flow configuration to each other.

12. An apparatus according to claim 10, wherein the reforming catalyst includes catalyst pellets.

13. An apparatus according to claim 10, wherein the reforming catalyst includes a structured catalyst support coated with a catalyst.

14. An apparatus according to claim 13, wherein the structured catalyst support is coated with a catalyst is removable.

15. An apparatus according to claim 10, wherein the reforming catalyst includes fecralloy sheets coated with a catalyst.

16. An apparatus according to claim 15, wherein the fecralloy sheets being in close contact with the combustor and the reformer.

* * * * *